US012646287B2

(12) United States Patent
Padilha et al.

(10) Patent No.: US 12,646,287 B2
(45) Date of Patent: Jun. 2, 2026

(54) FUSION OF SEGMENTATION MASKS FOR FIELD BOUNDARY DETECTION

(71) Applicant: Microsoft Technology Licensing, LLC, Redmond, WA (US)

(72) Inventors: Rafael Soares Padilha, Campinas (BR); Leonardo De Oliveira Nunes, Rio de Janeiro (BR); Roberto De Moura Estevao Filho, Teresopolis (BR); Ranveer Chandra, Kirkland, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 278 days.

(21) Appl. No.: 18/600,617

(22) Filed: Mar. 8, 2024

(65) Prior Publication Data

US 2025/0285404 A1     Sep. 11, 2025

(51) Int. Cl.
| | |
|---|---|
| *G06V 10/26* | (2022.01) |
| *G06V 10/36* | (2022.01) |
| *G06V 10/74* | (2022.01) |
| *G06V 10/774* | (2022.01) |
| *G06V 20/10* | (2022.01) |
| *G06V 20/13* | (2022.01) |

(52) U.S. Cl.
CPC ............ *G06V 10/267* (2022.01); *G06V 10/36* (2022.01); *G06V 10/761* (2022.01); *G06V 10/774* (2022.01); *G06V 20/188* (2022.01); *G06V 20/13* (2022.01)

(58) Field of Classification Search
None
See application file for complete search history.

(56) References Cited

U.S. PATENT DOCUMENTS

| | | | | |
|---|---|---|---|---|
| 12,502,072 B1 * | 12/2025 | Bhuiyan | .............. | A61B 3/1241 |
| 2018/0150955 A1 * | 5/2018 | Takeda | ................... | G06V 10/44 |

(Continued)

OTHER PUBLICATIONS

Ao et al., "Few-Shot Aerial Image Semantic Segmentation Leveraging Pyramid Correlation Fusion," IEEE Transactions on Geoscience and Remote Sensing, vol. 61, 2023, pp. 5624512 1-12 (Year: 2023).*

(Continued)

*Primary Examiner* — Soo Shin
(74) *Attorney, Agent, or Firm* — Barta Jones, PLLC

(57)     ABSTRACT

A computerized method performs fusion of segmentation masks to generate a refined segmentation mask. A plurality of segmentation masks, each including a group of segments, is obtained for a geographic area. For each segmentation mask, a subgroup of segments is filtered from the group of segments of the segmentation mask based on areas of the subgroup of segments. Pairs of segments of the filtered subgroup of segments are matched to form matched segment groups in the geographic area. Representative segments of the geographic area are selected from the matched segment groups to generate a refined segmentation mask including the selected representative segments. A segment-specific action is performed on at least one of the selected representative segments of the generated refined segmentation mask of the geographic area. In some examples, the segment-specific action is for precision farming in agriculture domain.

20 Claims, 7 Drawing Sheets

200

(56) References Cited

U.S. PATENT DOCUMENTS

| | | | | |
|---|---|---|---|---|
| 2019/0205485 A1* | 7/2019 | Rejeb Sfar | ............. | G06F 30/13 |
| 2019/0311202 A1* | 10/2019 | Lee | ........................ | G06T 9/002 |
| 2024/0423108 A1* | 12/2024 | Raz | ....................... | A01B 39/18 |

OTHER PUBLICATIONS

Valada et al., "Deep Multispectral Semantic Scene Understanding of Forested Environments using Multimodal Fusion," ISER 2016. Springer Proceedings in Advanced Robotics, 2017, vol. 1. Springer, Cham. https://doi.org/10.1007/978-3-319-50115-4_41 (Year: 2017).*
"FarmVibes.AI: Multi-Modal GeoSpatial ML Models for Agriculture and Sustainability", Retrieved from https://github.com/microsoft/farmvibes-ai, Mar. 2023, 5 Pages.

* cited by examiner

100

500

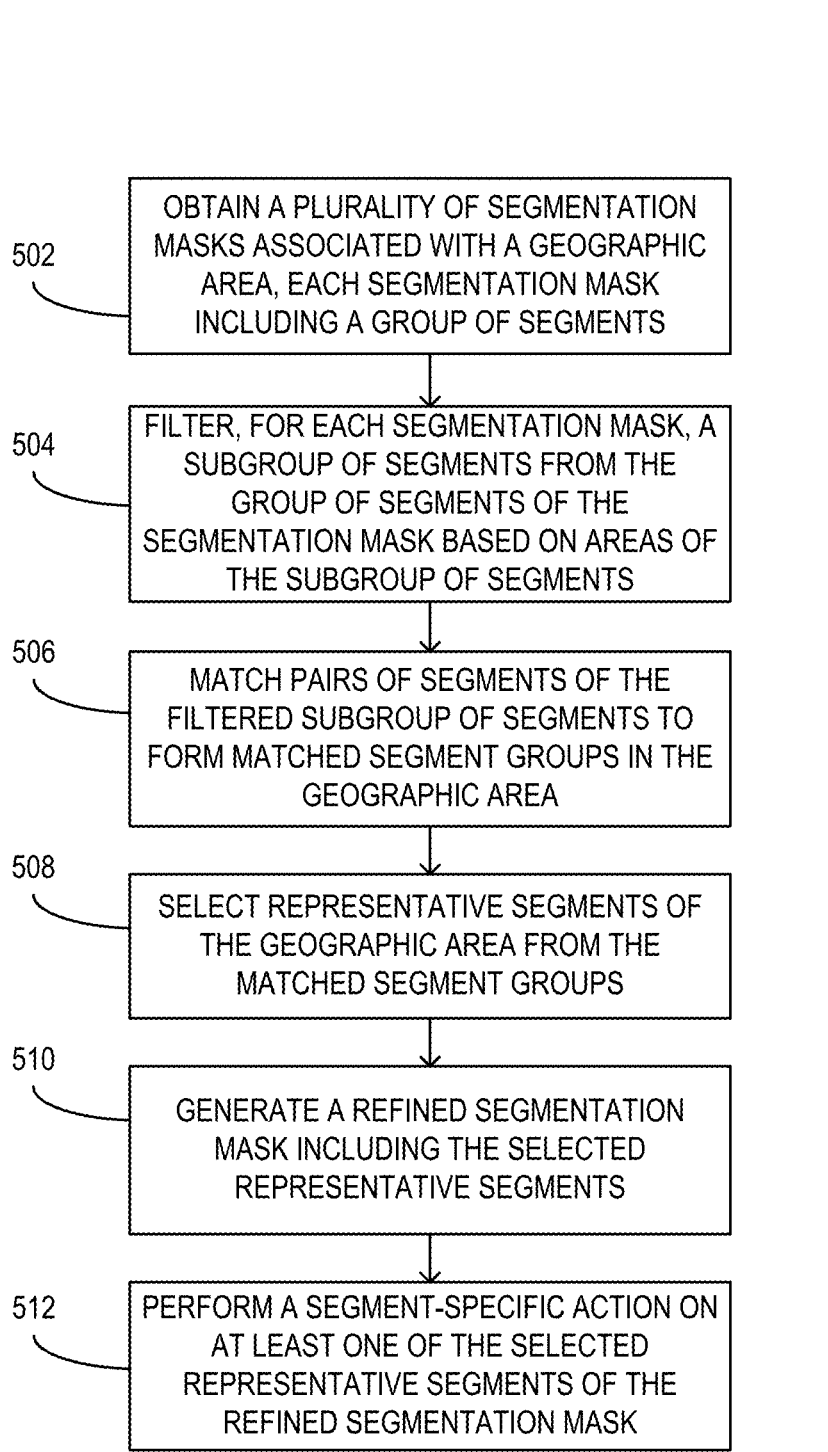

502 — OBTAIN A PLURALITY OF SEGMENTATION MASKS ASSOCIATED WITH A GEOGRAPHIC AREA, EACH SEGMENTATION MASK INCLUDING A GROUP OF SEGMENTS

504 — FILTER, FOR EACH SEGMENTATION MASK, A SUBGROUP OF SEGMENTS FROM THE GROUP OF SEGMENTS OF THE SEGMENTATION MASK BASED ON AREAS OF THE SUBGROUP OF SEGMENTS

506 — MATCH PAIRS OF SEGMENTS OF THE FILTERED SUBGROUP OF SEGMENTS TO FORM MATCHED SEGMENT GROUPS IN THE GEOGRAPHIC AREA

508 — SELECT REPRESENTATIVE SEGMENTS OF THE GEOGRAPHIC AREA FROM THE MATCHED SEGMENT GROUPS

510 — GENERATE A REFINED SEGMENTATION MASK INCLUDING THE SELECTED REPRESENTATIVE SEGMENTS

512 — PERFORM A SEGMENT-SPECIFIC ACTION ON AT LEAST ONE OF THE SELECTED REPRESENTATIVE SEGMENTS OF THE REFINED SEGMENTATION MASK

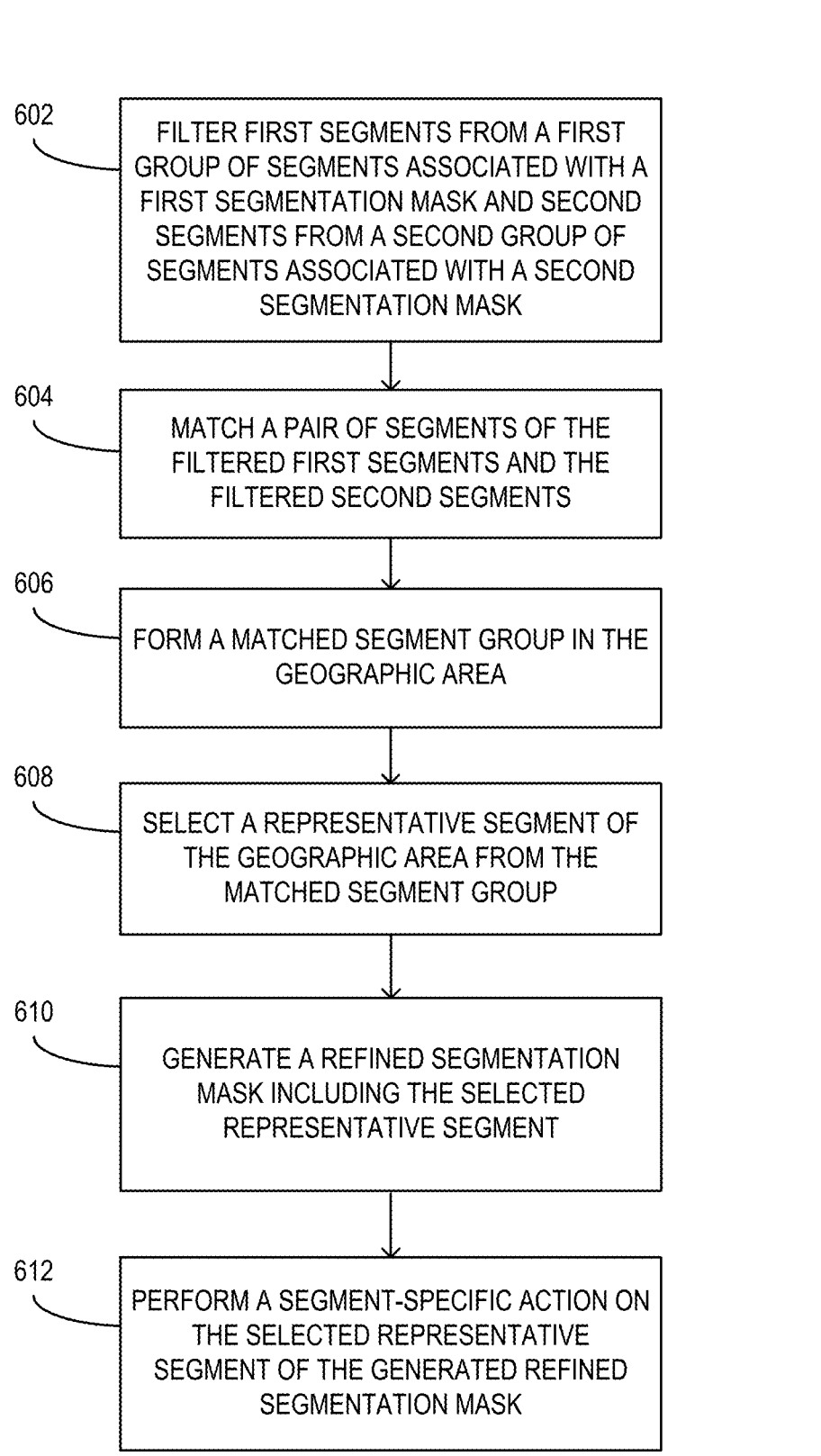

602 — FILTER FIRST SEGMENTS FROM A FIRST GROUP OF SEGMENTS ASSOCIATED WITH A FIRST SEGMENTATION MASK AND SECOND SEGMENTS FROM A SECOND GROUP OF SEGMENTS ASSOCIATED WITH A SECOND SEGMENTATION MASK

604 — MATCH A PAIR OF SEGMENTS OF THE FILTERED FIRST SEGMENTS AND THE FILTERED SECOND SEGMENTS

606 — FORM A MATCHED SEGMENT GROUP IN THE GEOGRAPHIC AREA

608 — SELECT A REPRESENTATIVE SEGMENT OF THE GEOGRAPHIC AREA FROM THE MATCHED SEGMENT GROUP

610 — GENERATE A REFINED SEGMENTATION MASK INCLUDING THE SELECTED REPRESENTATIVE SEGMENT

612 — PERFORM A SEGMENT-SPECIFIC ACTION ON THE SELECTED REPRESENTATIVE SEGMENT OF THE GENERATED REFINED SEGMENTATION MASK

FIG. 6

FUSION OF SEGMENTATION MASKS FOR FIELD BOUNDARY DETECTION

BACKGROUND

Accurate field boundary detection is required for a variety of domains, including farming. For example, accurate crop field boundary detection plays a crucial role in precision agriculture, enabling farmers to optimize planting, irrigation, fertilization, and pest control strategies while reducing resource waste. Additionally, properly mapping the extent of fields within a farm enables more granular analyses of crop development stage, vegetation health, yield prediction, among others. However, existing segmentation approaches, such as those that use daily Normalized Difference Vegetation Index (NDVI) rasters to segment crop fields, are computing resource intensive at least because the segmentation masks generated from different images do not provide consistent segmentation.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for field boundary detection of a geographic area is described. A plurality of segmentation masks, each including a group of segments, associated with a geographic area are obtained. For each segmentation mask, a subgroup of segments is filtered from the group of segments of the segmentation mask based on areas of the subgroup of segments. Pairs of segments of filtered subgroup of segments are matched to form matched segment groups in the geographic area. Representative segments of the geographic area are selected from the matched segment groups to generate a refined segmentation mask including the selected representative segments. A segment-specific action is performed on at least one of the selected representative segments of the generated refined segmentation mask of the geographic area.

BRIEF DESCRIPTION OF THE DRAWINGS

The present description will be better understood from the following detailed description read considering the accompanying drawings, wherein:

FIG. 5 is a flowchart illustrating an example method for performing fusion of segmentation masks and a segment-specific action on a representative segment of a refined segmentation mask;

FIG. 6 is a flowchart illustrating an example method for performing fusion of segmentation masks and a segment-specific action on a representative segment of a refined segmentation mask.

Corresponding reference characters indicate corresponding parts throughout the drawings. In FIGS. 1 to 7, the systems are illustrated as schematic drawings. The drawings may not be to scale. Any of the figures may be combined into a single example or embodiment.

DETAILED DESCRIPTION

Figure 1:
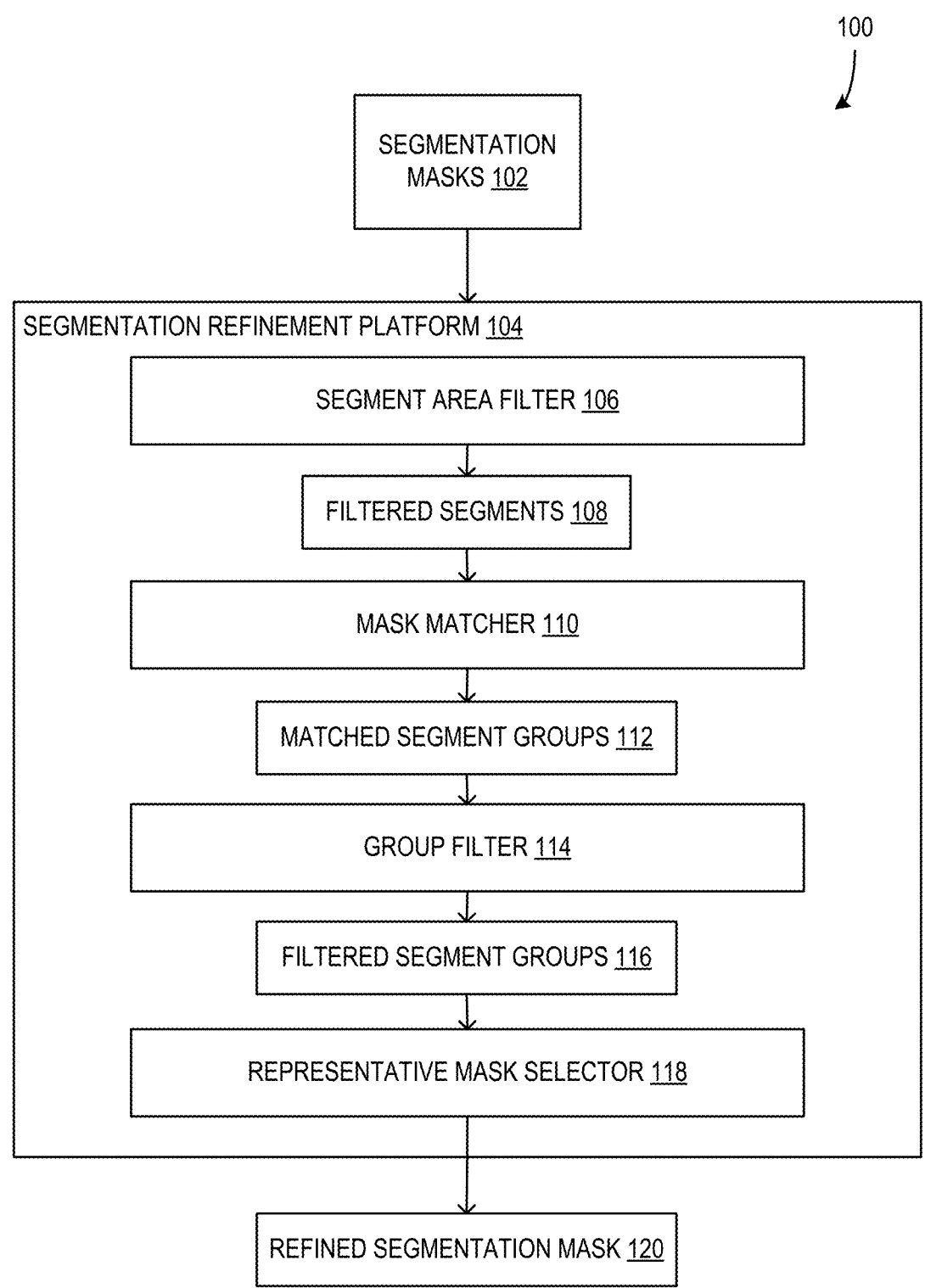
FIG. 1 is a block diagram illustrating an example system for generating a refined segmentation mask of a geographic area from fusion of segmentation masks.

Aspects of the disclosure provide systems and methods for performing fusion of segmentation masks to generate a refined segmentation mask that includes representative segments. A plurality of segmentation masks, each including a group of segments, associated with a geographic area are obtained. For each segmentation mask, a subgroup of segments is filtered from the group of segments of the segmentation mask based on areas of the subgroup of segments. Pairs of segments of the filtered subgroups of segments are matched to form matched segment groups in the geographic area. Representative segments of the geographic area are selected from the matched segment groups and a refined segmentation mask including the selected representative segments is generated. A segment-specific action is performed on at least one of the selected representative segments of the generated refined segmentation mask of the geographic area.

The disclosure operates in an unconventional manner at least by performing fusion of segmentation masks associated with a geographic area and generating a refined segmentation mask including representative segments that maximize a property (e.g., an area, Normalized Difference Vegetation Index (NDVI), etc.) of the refined segmentation mask. The refined segmentation mask better defines the field boundaries of the geographic area relative to existing systems, thereby enabling segment-specific action to be performed with precision on at least one of the representative segments of the generated refined segmentation mask of the geographic area.

Examples of the disclosure accept, as input, any number of segmentation masks representing crop field boundaries. The segmentation masks may be obtained from different dates, segmentation models, and types of input image (e.g., Sentinel-2, drone, vegetation index collected/computed over the same region). Examples of the disclosure capture variations in field boundary delineation due to the passage of time, model capacity, and input data domain (e.g., spatial resolution, multispectral information, etc.) to generate an improved and refined segmentation mask efficiently. For example, by filtering segments from the different segmentation masks, fewer computing resources (e.g., less memory usage, reduced processing load, and reduced bandwidth usage) are required for matching a pair of segments to form a matched segment group and for selecting a representative segment from the matched segment group. Further, the generated refined segmentation mask, including the selected representative segment, identifies the field boundaries of the geographic area more accurately. In this way, examples of the disclosure enable performing a segment-specific action of computing indexes such as health of a crop, water distressed, properties of the region, etc. The segment-specific action is used, for example, to automatically initiate or call a workflow to water the crops, intervene into the field's health, predict yield of the crop, fight a fire, and more.

FIG. 1 is a block diagram illustrating a system 100 for generating a refined segmentation mask 120 of a geographic area. In some examples, a plurality of segmentation masks 102 of the geographic area are obtained by the segmentation refinement platform 104. The segmentation masks 102 may be obtained from different dates, segmentation models, and types of input image (e.g., Sentinel-2, drone, vegetation index collected/computed over the same region) to capture variations in field boundary delineation due to the passage of time, model capacity, and input data domain (e.g., spatial resolution, multispectral information (e.g., RGB vs false-composite images), type of information being highlighted (e.g., vegetation index), etc.).

A segment area filter 106 is applied to the plurality of segmentation masks 102 to form filtered segments 108. A mask matcher 110 is used to generate matched segment groups 112 from the filtered segments 108. A group filter 114 is applied to the matched segment groups 112 to form the filtered segment groups 116. Then, a representative mask selector 118 is configured to select representative mask(s) from the filtered segment groups 116 to form the refined segmentation mask 120. The refined segmentation mask 120 is then used in analysis of the features of the geographic region. In some such examples, the refined segmentation mask 120 includes segments that represent the boundaries of various crop fields or other delineated portions of the geographic area.

Figure 7:
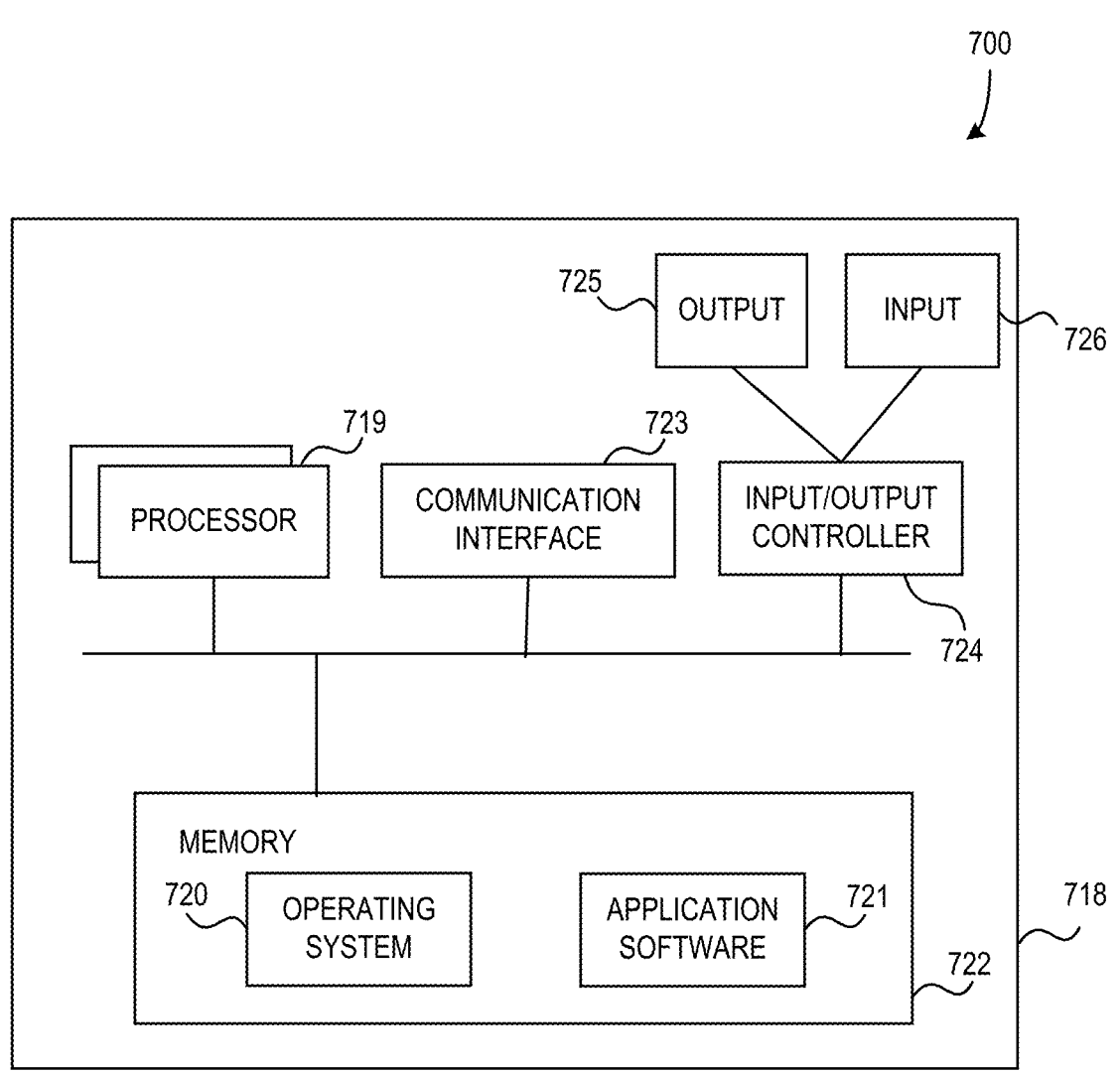
FIG. 7 illustrates an example computing apparatus as a functional block diagram.

Further, in some examples, the system 100 includes one or more computing devices (e.g., the computing apparatus of FIG. 7) that are configured to communicate with each other via one or more communication networks (e.g., an intranet, the Internet, a cellular network, other wireless network, other wired network, or the like). In some examples, entities of the system 100 are configured to be distributed between the multiple computing devices and to communicate with each other via network connections. For example, segmentation masks 102 are obtained by a first computing device and the segmentation refinement platform 104 is executed on a second computing device within the system 100. The first computing device and second computing device are configured to communicate with each other via network connections. Alternatively, in some examples, other components of the segmentation refinement platform 104 (e.g., the mask matcher 110 and the representative mask selector 118) are executed on separate computing devices and those separate computing devices are configured to communicate with each other via network connections during the operation of the segmentation refinement platform 104. In other examples, other organizations of computing devices are used to implement system 100 without departing from the description.

In some examples, the segmentation masks 102 are derived from satellite images of the geographic area upon which some form of segmentation algorithm or analysis has been performed. For instance, in an example, a Segment Anything Model (SAM) is used to generate the segmentation masks 102 from a plurality of satellite images of the geographic area. Additionally, or alternatively, the segmentation masks 102 are based on other types of input data, such as photos or images obtained using drones or the like.

Further, in some examples, the images from which the segmentation masks 102 are generated are from a variety of different dates and/or times. Collecting the data over time captures changes in crop growth stages, seasonal changes, and/or changes as a result of farming tasks such as tilling fields or other procedures. Such variation results in different, but often complimentary segmentation masks.

Additionally, in some such examples, those images include a variety of types of data, such as photos taken by a drone, radar image data and/or multi-spectral data collected by a satellite, and/or vegetation index data of the geographic area. Further, in some examples, the segmentation masks 102 include masks generated using a variety of different models and/or segmentation techniques.

The segment area filter 106 is configured to analyze some or all of the segmentation masks 102 and to remove outlier segments and/or artifacts that are present therein. Such artifacts tend to be irrelevant to the determination of the refined segmentation mask 120 and they increase the computational burden on the segmentation refinement platform 104 when present. In some examples, for each segmentation mask 102, the area of each segment in the mask 102 is calculated and some of the segments with the calculated areas below a threshold quantile (e.g., 25%) are filtered out of the segmentation mask 102. For instance, in an example, segments with lowest 25% of the areas are filtered out of the segmentation masks 102. Alternatively, or additionally, the area values are stored and a filtering quantile of those stored values is determined, such that all segments with areas within that filtering quantile are filtered (e.g., the lowest 15% of area values includes a highest value of X, such that all segments in a mask 102 that have an area value of X or less are filtered out of the mask 102). In other examples, other features are used to filter the segments, such as filtering based on average with Normalized Difference Vegetation Index (NDVI) to filter out segments low/underdeveloped degree of vegetation, without departing from the description.

The filtered segments 108 include sets of segments for each segmentation mask 102 that have not been removed during the application of the segment area filter 106. Thus, in some examples, the filtered segments 108 include all the segments of the segmentation masks 102 that exceed the areas that were filtered out by the segment area filter 106. The result is groups of segments that include far fewer irrelevant or inaccurate artifact segments.

The mask matcher 110 is configured to identify segments between multiple segmentation masks 102 that represent the same crop field or other region in the geographic area. In some examples, the filtered segments 108 of two segmentation masks 102 are analyzed to calculate the Intersection Over Union (IOU) of pairs of segments, wherein each pair of segments includes a segment (i.e., a filtered segment) from a first segmentation mask and a segment (e.g., a filtered segment) from a second segmentation mask. The IOU measurement measures the similarity between the two segments of the pair based on how much they intersect in relation to a union of their individual areas. If a pair of segments has an IOU measurement that exceeds a defined threshold, the pair of segments is considered to represent the same crop field or region of the geographic area. In some examples, the mask matcher 110 performs this analysis for some or all pairs of segmentation masks 102 and, within those segmentation mask pairs, some or all pairs of segments between the masks. Alternatively, or additionally, if a segment in a first segmentation mask has already been determined to match a segment in a second segmentation mask, those matched segments are not analyzed with respect to other segments.

While described in some examples as pairs of segments from first and second segmentation masks, aspects of the disclosure are operable over any combination of segments from any combination of segmentation masks.

When the mask matcher 110 finishes the analysis of the filtered segments 108 of the segmentation masks 102, matched segment groups 112 are formed. In some examples, a matched segment group 112 includes a plurality of segments from a plurality of segmentation masks 102 that represent a single crop field or other region in the geographic area. In some such examples, a matched segment group 112 includes a single segment from each segmentation mask 102 of at least a portion of the segmentation masks 102.

In some examples, the group filter 114 is configured to filter out segmented entities that only appear in a few (e.g., less than a threshold number) of the segmentation masks 102. In many cases, such entities represent segmentation artifacts and/or transient elements (e.g., clouds or temporary field divisions) that should not be considered in the final mask. Matched segment groups 112 that have segment members from a large variety of the segmentation masks 102 are more likely to represent reoccurring entities such as crop fields or regions, while matched segment groups 112 that have segment members from a relatively small number of segmentation masks 102 are more likely to be irrelevant artifacts. In some examples, the group filter 114 is configured to include a defined group size ratio that represents the minimum percentage of segmentation masks 102 from which a matched segment group 112 includes a segment to not be filtered out by the group filter 114. For instance, in an example, the group size ratio is 40% and the quantity of segmentation masks 102 is 100. A matched segment group 112 with segments from 39 segmentation masks 102 is filtered out while a matched segment group 112 with segments from 41 segmentation masks 102 is not filtered out and becomes part of the filtered segment groups 116. In other examples, the group filter 114 is configured to filter out some of the matched segment groups 112 in other ways without departing from the description.

After the group filter 114 has been applied to the matched segment groups 112, the filtered segment groups 116 are formed. In some examples, the filtered segment groups 116 are those matched segment groups 112 that were not filtered out by the group filter 114 as described herein. Thus, each filtered segment group 116 includes a plurality of segments from a plurality of the segmentation masks 102 that are representative of a single crop field or other region of the geographic area.

The representative mask selector 118 is configured to select a representative segment in each filtered segment group 116 to be part of the refined segmentation mask 120. In some examples, the representative mask selector 118 is configured to select segments based on a maximized or otherwise optimized specific property (e.g., segment area or average NDVI within segments of the associated filtered segment group 116). Any remaining segments from the filtered segment groups 116 are suppressed or otherwise not included in the refined segmentation mask 120. For instance, in an example, the representative mask selector 118 identifies segment area value of the segments in a filtered segment group 116 that has the largest area. This ensures that the whole field geometry is covered and avoids getting only part of the field geometry. Alternatively, or additionally, in some examples, the IOU values associated with each segment of the filtered segment group 116 from the processing of the mask matcher 110 are used to select the representative segment (e.g., the segment that overlaps the closest with the other segments of the filtered segment group 116 based on the associated IOU values is selected). In other examples, the representative mask selector 118 selects representative segments from the filtered segment groups 116 in other ways without departing from the description.

Figure 2:
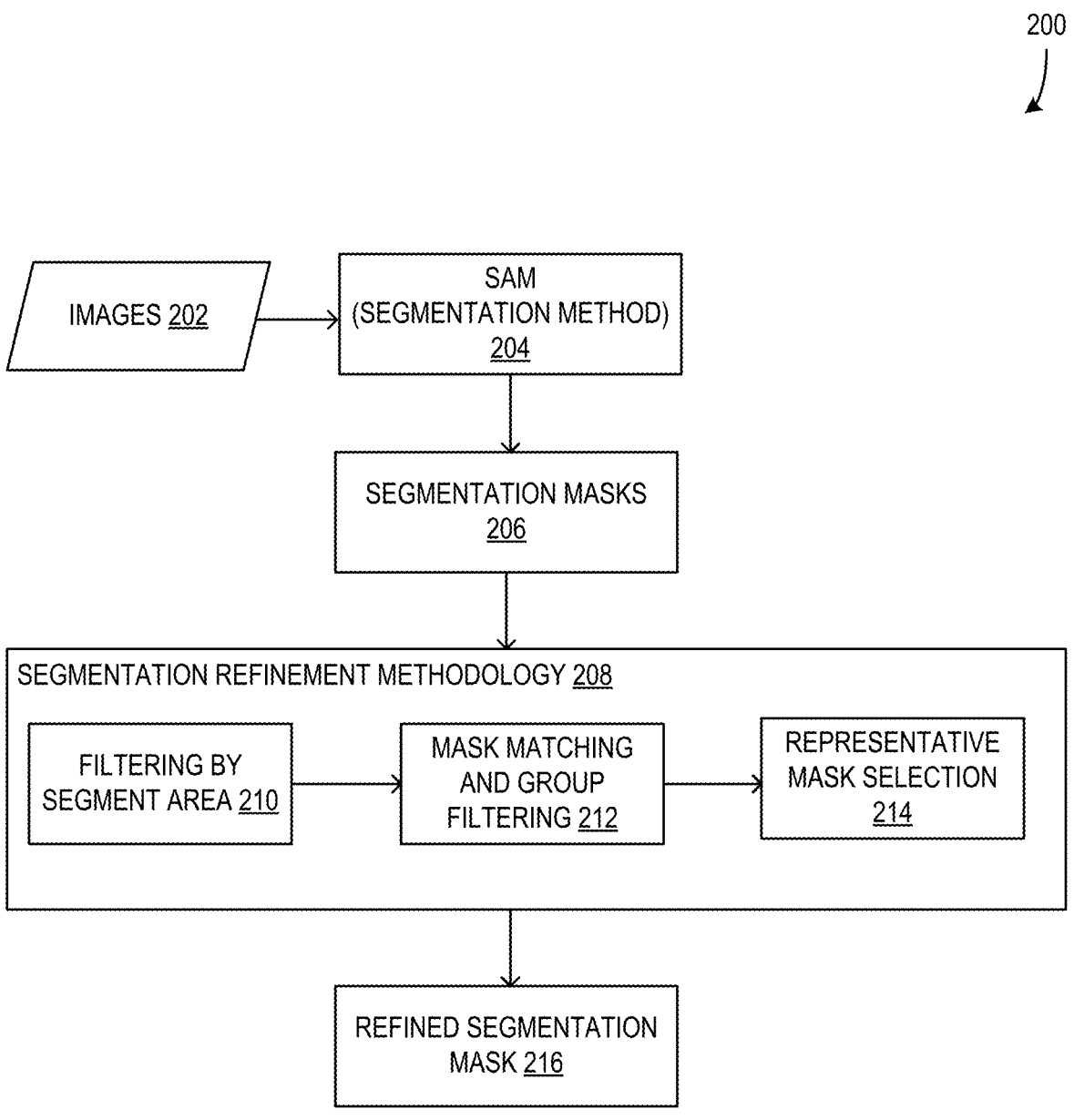
FIG. 2 is a block diagram illustrating an example system for generating a refined segmentation mask from images.

FIG. 2 is a block diagram illustrating a system 200 for generating a refined segmentation mask 216 from images 202. In some examples, the segmentation masks 206 are derived from satellite images of the geographic area upon which some form of segmentation method such as a Segment Anything Model (SAM) is applied to generate the segmentation masks 206 from a plurality of satellite images 202 of a same or overlapping geographic area. In some examples, the segments in the segmentation masks 206 are identified differently and it may not be known, without the segmentation refinement methodology 208, which of the segments in the segmentation masks 206 of the geographic area have been identified correctly or incorrectly. Examples of the disclosure use the segmentation refinement methodology 208 to generate a refined segmentation mask 216 that accurately identifies or at least identifies with more confidence the boundaries of the segments in the refined segmentation mask 216 of the geographic area.

In some examples, the segmentation refinement methodology 208 refines field boundary segmentation masks 206 (such as crop field boundary segmentation masks) extracted with foundational segmentation models (such as SAM). The refinement combines information from segmentation masks 206 collected from multiple captures (multispectral imagery, drone footage, multispectral indices, etc.) in different moments in time. The most reliable segments across the available masks 206 are selected to compose the output segmentation mask (e.g., refined segmentation mask 216) for fields in a region.

Images 202 may be obtained from one or more of a satellite, drone, and any other source. Segmentation refinement methodology 208 is applied to the segmentation masks 206 to generate the refined segmentation mask 216. The segmentation refinement methodology 208 includes filtering by segment area 210, mask matching and group filtering 212, and representative mask selection 214. Some or all of the segmentation masks 206 are analyzed by the filtering by segment area 210 and outlier segments and/or artifacts that are present therein are removed. In some examples, for each segmentation mask 206, the area of each segment in the mask 206 is calculated and some portion of the segments with the calculated areas below a threshold quantile (e.g., 25%) are filtered out of the segmentation mask 206. Thus, the filtered segments (such as the filtered segments 108 in FIG. 1) have areas equal to or more than the threshold quantile.

Mask matching and group filtering 212 is performed on the filtered segments to identify segments (e.g., matched segment groups 112 in FIG. 1) between the multiple segmentation masks 206 that represent the same field (e.g., crop field or other region) in the geographic area and to filter out segmented entities that only appear in a few (e.g., less than a threshold number) of the segmentation masks 206 forming filtered segment groups (e.g., filtered segment groups 116 in FIG. 1). The representative mask selection 214 is performed to select a representative segment in each filtered segment group to be part of the refined segmentation mask 216.

Figure 3:
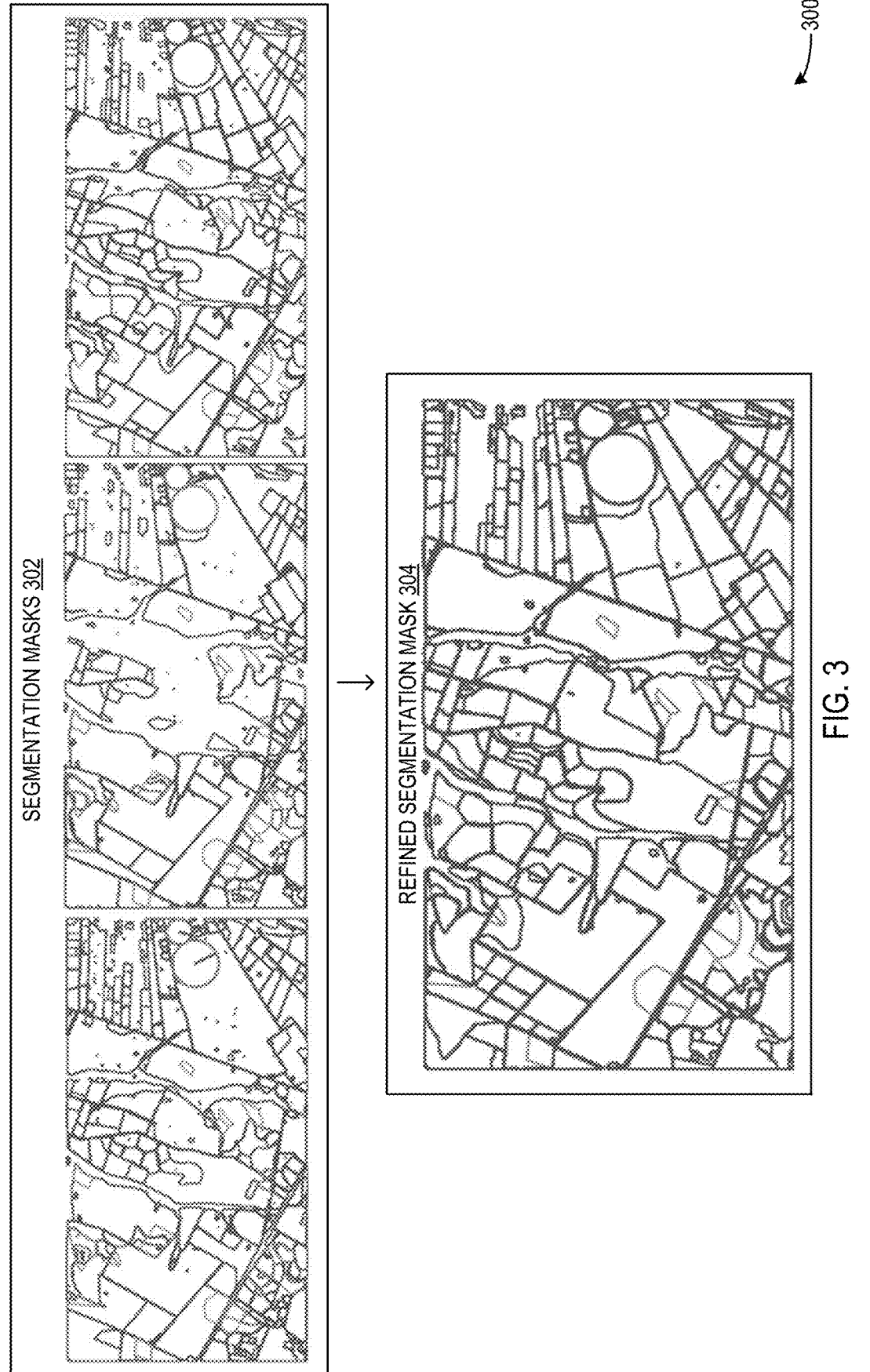
FIG. 3 is a diagram showing fusion of segmentation masks to generate a refined segmentation mask maximizing area of segments.

FIG. 3 is a diagram 300 showing fusion of segmentation masks 302 to generate a refined segmentation mask 304. In this example, the fusion is based on area of the segmentation masks 302. Segmentation masks 302 are generated from different images that may be captured at different dates and/or times. In some examples, the images may be captured by different modalities (e.g., satellite, drone, etc.) and/or may have different resolutions. Each of the segmentation masks 302 shows different filtered segments (e.g., including segments below a threshold area that need to be filtered out). Some of the filtered segments are identified in one, two, or all three of the segmentation masks 302. In this example, the segments which are shown in only one of the segmentation masks 302 are filtered out and the segments which are shown in two or all three of the segmentation masks 302 are selected as representative segments of the geographic area. Further, in this example, the segment which has maximum area from the matched segment groups is selected as representative segment of the geographic area. The selected representative segment is shown in the generated refined segmentation mask 304.

Figure 4:
FIG. 4 is a diagram showing fusion of segmentation masks to generate a refined segmentation mask maximizing Normalized Difference Vegetation Index (NDVI)

FIG. 4 is a diagram 400 showing fusion of segmentation masks 402 to generate a refined segmentation mask 404 which is a based on NDVI of the segmentation masks 402. Segmentation masks 402 are generated from different images that may be captured at different dates and/or times. In some examples, the images may be captured by different modalities (e.g., satellite, drone, etc.) and/or may have different resolutions. Each of the segmentation masks 402 shows different filtered segments (e.g., including segments below a threshold NDVI that need to be filtered out). Some of the filtered segments are identified in one, two, or all three of the segmentation masks 402. In this example, the segments which are shown in only one of the segmentation masks 402 are filtered out and the segments which are shown in two or all three of the segmentation masks 402 are selected as representative segments of the geographic area. Further, in this example, the segments having maximum average NDVI from the matched segment groups are selected as representative segments of the geographic area. The selected representative segments are shown in the generated refined segmentation mask 404.

FIG. 5 is a flowchart illustrating an example method 500 for performing fusion of segmentation masks and a segment-specific action on a representative segment of a refined segmentation mask. In some examples, the method 500 is executed or otherwise performed in a system such as systems 100 and 200 of FIGS. 1 and 2, respectively.

At 502, a plurality of segmentation masks associated with a geographic area is obtained. Each segmentation mask includes a group of segments. In some examples, the segmentation masks may be associated with images captured on a single day that may have less variation. Examples of the disclosure work well with any segmentation masks, but work particularly well with the segmentation masks that are associated with images captured on different days. At 504, for each segmentation mask, a subgroup of segments is filtered from the group of segments of the segmentation mask based on areas of the subgroup of segments. For example, for each segmentation mask, areas of the segments are calculated and the subgroup of segments is filtered based on the calculated areas of segments being above a filtering quantile (e.g., filtering out segments with calculated areas below 25%). At 506, pairs of segments of the filtered subgroup of segments are matched to form matched segment groups in the geographic area. For example, an intersection over union (IOU) between the pairs of segments is calculated. The IOU represents a measurement of a similarity between two segments through how much they intersect in relation to a union of their individual areas. The two segments are identified as matching based on the calculated IOU above a threshold.

At 508, representative segments of the geographic area are selected from the matched segment groups to generate a refined segmentation mask including the selected representative segments at 510. In some examples, the representative segments are selected to maximize an area of the refined segmentation mask of the geographic area. In some other examples, the representative segments are selected to maximize average NDVI of the refined segmentation mask of the geographic area. Thus, the property to be maximized (e.g., area, average NDVI) is considered within each segment (i.e., among all segments of a filtered segment group 116). This choice does not consider segments from other groups as the goal is not to maximize the property across all the refined segmentation mask, but greedily per filtered segment group 116. At 512, a segment-specific action is performed on at least one of the selected representative segments of the generated refined segmentation mask of the geographic area.

FIG. 6 is a flowchart illustrating an example method 600 for performing fusion of segmentation masks and a segment-specific action on a representative segment of a refined segmentation mask. In some examples, the method 600 is executed or otherwise performed in a system such as systems 100 and 200 of FIGS. 1 and 2, respectively.

At 602, first segments are filtered from a first group of segments associated with a first segmentation mask and second segments are filtered from a second group of segments associated with a second segmentation mask based on areas of the first segments and the second segments, wherein the first segmentation mask and the second segmentation mask are associated with a geographic area. At 604, matching at least a pair of segments of the filtered first segments and the filtered second segments is performed. At 606, based on the matching, a matched segment group in the geographic area is formed. At 608, at least one representative segment of the geographic area is selected from the matched segment group. At 610, a refined segmentation mask including the selected representative segment is generated. At 612, a segment-specific action is performed on the selected representative segment (or at least one of the selected representative segments if multiple were selected) of the generated refined segmentation mask of the geographic area.

In an agriculture domain, the segment-specific action may help in precision farming (e.g., to optimize planting, irrigation, fertilization, pest control strategies, etc.) while reducing resource wastage because the boundaries of the segments of the geographic area are identified accurately or with more confidence value. Additionally, properly mapping the extent of fields within a farm enables more granular analyses of crop development stage, vegetation health, yield prediction, among others. For example, for a large geographic area, aspects of the disclosure enable knowing how things are growing on a per field level. Examples of the disclosure require less data and temporal coverage than existing approaches enabling continuous smart agriculture and sustainability applications that rely on accurate field boundary delineation.

While some examples herein are described in the context of farming, examples of the disclosure may be used in other domains. For example, aspects of the disclosure are operable to detect field boundaries in other domains and applications such as real estate, construction, forests, mining, etc. As an example, a field boundary for a forest fire is detected with precision using aspects of the disclosure, and a segment-specific action for dousing the fire may be performed with accuracy.

In some examples, the refined segmentation mask is presented to a user who may adjust the boundaries of some of the representative segments in the refined segmentation mask. In this way, all the segmentation masks need not be processed thereby saving computing resources (e.g., processor, memory, network resources, etc.) and enabling better utilization of user time as well. In some examples, machine learning techniques are applied and the refined segmentation mask is fed back to the system 200 to modify the segmentation method 204 (e.g., SAM) so that more precise segmentation masks are generated in future using the modified segmentation method 204. The modified segmentation method 204 may be adapted to better use multiple frequency regions of satellite data. Over time, the modified segmentation method 204 will provide accurate segmentation masks that do not over segment (e.g., include segments for clouds or shadows etc.) or under segment (e.g., a big region that was considered a single entity by the unmodified segmentation method 204, but there are several fields within it).

Additional Examples

An example algorithm implementing aspects of the disclosure is next described.

A set of segmentation masks M, with associated segments s is taken as input. The output is a mask composed by the set of final segments F. The parameters include filtering_quantile q, same_field_iou_thr t, group_size_ratio r.

Filtering in this example is implemented as:

a. For each mask m in M and for each segment s in m:
  i. Compute the area of s and store it: $A=A+\{area(s)\}$
b. Compute the bottom quantile q among areas in A:
  a=quantile (A, q) In some examples, the quantile q is varied from 0.0 to 0.3 (e.g., for filtering out the segments with the bottom 0%~30% smallest areas).
c. For each mask m in M, remove segment s in m, if area(s)<a Mask matching in this example is implemented as:

a. Compute the pairwise IoU between segments of M: IoU ($s_i$, $s_j$) for $s_i$, $s_j$ in the set of segments from all masks m in M, with i!=j.
b. Identify same-field segments, as IoU ($s_i$, $s_j$)>t. Store in a Boolean matrix B, with $B_{i,j}=1$ if IoU ($s_i$, $s_j$)>t else $B_{i,j}=0$, for any two segments $s_i$ and $s_j$. In some examples, for matching multiple segments, a threshold parameter same_field_iou_thr is varied from 0.5 to 0.9. If the IoU between two segments is above this parameter, those segments are considered as representing the same crop field.

Group filtering in this example is implemented as:

a. Define final set of segments as F={ }.
b. Sort segments by area in decreasing order: S=sort (M, A)
c. For each segment $s_i$ in S (from largest to smallest):
  i. Count the number of matching fields: $c_i$=sum ($B_{i,j}$), i fixed but for all j!=i
  ii. If the number of matching fields is higher than group_size_ratio r, include segment $s_i$ in F: $F=F+\{s_i\}$ if $c_i$>r.
    In some examples, the parameter group_size_ratio defines the minimum percentage of occurrences of a segment group within all input maps to be considered for the following step. A segment having group_size_ratio varied between 0.5 and 0.9 may be selected as the representative segment.
  iii. Suppress other segments $s_k$ that match $s_i$: $B_{i,k}=B_k$, i=0 for all $s_k$ in M Exemplary Operating Environment The present disclosure is operable with a computing apparatus according to an embodiment as a functional block diagram 700 in FIG. 7. In an example, components of a computing apparatus 718 are implemented as a part of an electronic device according to one or more embodiments described in this specification. The computing apparatus 718 comprises one or more processors 719 which may be microprocessors, controllers, or any other suitable type of processors for processing computer executable instructions to control the operation of the electronic device. Alternatively, or in addition, the processor 719 is any technology capable of executing logic or instructions, such as a hard-coded machine. In some examples, platform software comprising an operating system 720 or any other suitable platform software is provided on the apparatus 718 to enable application software 721 to be executed on the device. In some examples, generating a refined segmentation mask from a plurality of segmentation masks for field boundary detection as described herein is accomplished by software, hardware, and/or firmware.

In some examples, computer executable instructions are provided using any computer-readable media that is accessible by the computing apparatus 718. Computer-readable media include, for example, computer storage media such as a memory 722 and communications media. Computer storage media, such as a memory 722, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media does not include communication media. Therefore, a computer storage medium is not a propagating signal. Propagated signals are not examples of computer storage media. Although the computer storage medium (the memory 722) is shown within the computing apparatus 718, it will be appreciated by a person skilled in the art, that, in some examples, the storage is distributed or located remotely and accessed via a network or other communication link (e.g., using a communication interface 723).

Further, in some examples, the computing apparatus 718 comprises an input/output controller 724 configured to output information to one or more output devices 725, for example a display or a speaker, which are separate from or integral to the electronic device. Additionally, or alternatively, the input/output controller 724 is configured to receive and process an input from one or more input devices 726, for example, a keyboard, a microphone, or a touchpad. In one example, the output device 725 also acts as the input device. An example of such a device is a touch sensitive display. The input/output controller 724 may also output data to devices other than the output device, e.g., a locally connected printing device. In some examples, a user provides input to the input device(s) 726 and/or receives output from the output device(s) 725.

The functionality described herein can be performed, at least in part, by one or more hardware logic components. According to an embodiment, the computing apparatus 718 is configured by the program code when executed by the processor 719 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, or the like) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that are suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example system comprises a processor; and a memory comprising computer program code, the memory and the computer program code configured to cause the processor to: filter first segments from a first group of segments associated with a first segmentation mask and second segments from a second group of segments associated with a second segmentation mask based on areas of the first segments and the second segments, wherein the first segmentation mask and the second segmentation mask are associated with a geographic area; match a pair of segments of the filtered first segments and the filtered second segments; based on the matching, form a matched segment group in the geographic area; select a representative segment of the geographic area from the matched segment group; generate a refined segmentation mask including the selected representative segment; and perform a segment-specific action on the selected representative segment of the generated refined segmentation mask of the geographic area.

An example computerized method comprises obtaining a plurality of segmentation masks associated with a geographic area, wherein each segmentation mask of the plurality of segmentation masks includes a group of segments; filtering, for each segmentation mask, a subgroup of segments from the group of segments of the segmentation mask based on areas of the subgroup of segments; matching pairs of segments of the filtered subgroup of segments to form matched segment groups in the geographic area; selecting representative segments of the geographic area from the matched segment groups; generating a refined segmentation mask including the selected representative segments; and performing a segment-specific action on at least one of the selected representative segments of the generated refined segmentation mask of the geographic area.

An example computer storage medium has computer-executable instructions that, upon execution by a processor, cause the processor to at least: obtain a plurality of segmentation masks associated with a geographic area, wherein each segmentation mask of the plurality of segmentation masks includes a group of segments; filter, for each segmentation mask, a subgroup of segments from the group of segments of the segmentation mask based on areas of the subgroup of segments; match pairs of segments of the filtered subgroup of segments to form matched segment groups in the geographic area; select representative segments of the geographic area from the matched segment groups; generate a refined segmentation mask including the selected representative segments; and perform a segment-specific action on at least one of the selected representative segments of the refined segmentation mask of the geographic area.

Alternatively, or in addition to the other examples described herein, examples include any combination of the following:

wherein the filtering comprises: calculating areas of segments of the first group of segments and the second group of segments; and filtering the first segments from the first group of segments and the second segments from the second group of segments based on the areas of the first segments and the second segments being above a filtering quantile.

wherein the matching comprises: calculating an intersection over union (IOU) between the pair of segments, the IOU measuring a similarity between two segments through how much they intersect in relation to a union of their individual areas; and identifying the two segments as matching based on the calculated IOU above a threshold.

wherein the first segmentation mask and the second segmentation mask are extracted using a segmentation model, wherein the computer program code is further configured to cause the processor to: update the segmentation model using the refined segmentation mask of the geographic area.

wherein the representative segments are selected to maximize an area of the refined segmentation mask of the geographic area.

wherein the representative segments are selected to maximize normalized difference vegetation index (NDVI) of the refined segmentation mask of the geographic area.

wherein the first segmentation mask and the second segmentation mask are extracted from images representing at least one of temporal variation or diverse data modalities.

wherein the filtering comprises: calculating, for each segmentation mask, areas of segments; and filtering the subgroup of segments based on the calculated areas of segments being above a filtering quantile.

calculating an intersection over union (IOU) between the pairs of segments, the IOU measuring a similarity between two segments through how much they intersect in relation to a union of their individual areas; and identifying the two segments as matching based on the calculated IOU above a threshold.

wherein the plurality of segmentation masks is extracted using a segmentation model, wherein the method further comprises: updating the segmentation model using the refined segmentation mask of the geographic area.

wherein the plurality of segmentation masks is extracted from images representing at least one of temporal variation or diverse data modalities.

Any range or device value given herein may be extended or altered without losing the effect sought, as will be apparent to the skilled person.

Examples have been described with reference to data monitored and/or collected from the users (e.g., user identity data with respect to profiles). In some examples, notice is provided to the users of the collection of the data (e.g., via a dialog box or preference setting) and users are given the opportunity to give or deny consent for the monitoring and/or collection. The consent takes the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute an exemplary means for obtaining a plurality of segmentation masks associated with a geographic area, wherein each segmentation mask of the plurality of segmentation masks includes a group of segments; exemplary means for filtering, for each segmentation mask, a subgroup of segments from the group of segments of the segmentation mask based on areas of the subgroup of segments; exemplary means for matching pairs of segments of the filtered subgroup of segments to form matched segment groups in the geographic area; exemplary means for selecting representative segments of the geographic area from the matched segment groups; exemplary means for generating a refined segmentation mask including the selected representative segments; and exemplary means for performing a segment-specific action on at least one of the selected representative segments of the generated refined segmentation mask of the geographic area.

The term "comprising" is used in this specification to mean including the feature(s) or act(s) followed thereafter, without excluding the presence of one or more additional features or acts.

In some examples, the operations illustrated in the figures are implemented as software instructions encoded on a computer readable medium, in hardware programmed or designed to perform the operations, or both. For example, aspects of the disclosure are implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:

a processor; and a memory comprising computer program code, the memory and the computer program code configured to cause the processor to:

filter first segments from a first group of segments associated with a first segmentation mask and second segments from a second group of segments associated with a second segmentation mask based on areas of the first segments and the second segments, wherein the first segmentation mask and the second segmentation mask are associated with a geographic area;

match a pair of segments of the filtered first segments and the filtered second segments;

based on the matching, form a matched segment group in the geographic area;

select a representative segment of the geographic area from the matched segment group;

generate a refined segmentation mask including the selected representative segment; and perform a segment-specific action on the selected representative segment of the generated refined segmentation mask of the geographic area.

2. The system of claim 1, wherein the filtering comprises:
calculating areas of segments of the first group of segments and the second group of segments; and
filtering the first segments from the first group of segments and the second segments from the second group of segments based on the areas of the first segments and the second segments being above a filtering quantile.

3. The system of claim 1, wherein the matching comprises:
calculating an intersection over union (IOU) between the pair of segments, the IOU measuring a similarity between two segments through how much they intersect in relation to a union of their individual areas; and
identifying the two segments as matching based on the calculated IOU above a threshold.

4. The system of claim 1, wherein the first segmentation mask and the second segmentation mask are extracted using a segmentation model, wherein the computer program code is further configured to cause the processor to:
update the segmentation model using the refined segmentation mask of the geographic area.

5. The system of claim 1, wherein the representative segment is selected to maximize an area of the refined segmentation mask of the geographic area.

6. The system of claim 1, wherein the representative segment is selected to maximize normalized difference vegetation index (NDVI) of the refined segmentation mask of the geographic area.

7. The system of claim 1, wherein the first segmentation mask and the second segmentation mask are extracted from images representing at least one of temporal variation or diverse data modalities.

8. A computerized method comprising:
obtaining a plurality of segmentation masks associated with a geographic area, wherein each segmentation mask of the plurality of segmentation masks includes a group of segments;
filtering, for each segmentation mask, a subgroup of segments from the group of segments of the segmentation mask based on areas of the subgroup of segments;
matching pairs of segments of the filtered subgroup of segments to form matched segment groups in the geographic area;
selecting representative segments of the geographic area from the matched segment groups;
generating a refined segmentation mask including the selected representative segments; and
performing a segment-specific action on at least one of the selected representative segments of the generated refined segmentation mask of the geographic area.

9. The computerized method of claim 8, wherein filtering comprises:
calculating, for each segmentation mask, areas of segments; and
filtering the subgroup of segments based on the calculated areas of segments being above a filtering quantile.

10. The computerized method of claim 8, further comprising:
calculating an intersection over union (IOU) between the pairs of segments, the IOU measuring a similarity between two segments through how much they intersect in relation to a union of their individual areas; and identifying the two segments as matching based on the calculated IOU above a threshold.

11. The computerized method of claim 8, wherein the plurality of segmentation masks is extracted using a segmentation model, wherein the method further comprises:
updating the segmentation model using the refined segmentation mask of the geographic area.

12. The computerized method of claim 8, wherein the representative segments are selected to maximize an area of the refined segmentation mask of the geographic area.

13. The computerized method of claim 8, wherein the representative segments are selected to maximize normalized difference vegetation index (NDVI) of the refined segmentation mask of the geographic area.

14. The computerized method of claim 8, wherein the plurality of segmentation masks is extracted from images representing at least one of temporal variation or diverse data modalities.

15. A computer storage medium has computer-executable instructions that, upon execution by a processor, cause the processor to at least:
obtain a plurality of segmentation masks associated with a geographic area, wherein each segmentation mask of the plurality of segmentation masks includes a group of segments;
filter, for each segmentation mask, a subgroup of segments from the group of segments of the segmentation mask based on areas of the subgroup of segments;
match pairs of segments of the filtered subgroup of segments to form matched segment groups in the geographic area;
select representative segments of the geographic area from the matched segment groups;
generate a refined segmentation mask including the selected representative segments; and
perform a segment-specific action on at least one of the selected representative segments of the refined segmentation mask of the geographic area.

16. The computer storage medium of claim 15, wherein the filtering comprises:
calculating, for each segmentation mask, areas of segments; and
filtering the subgroup of segments based on the calculated areas of segments being above a filtering quantile.

17. The computer storage medium of claim 15, wherein the computer-executable instructions upon execution by the processor further cause the processor to:
calculate an intersection over union (IOU) between the pairs of segments, the IOU measuring a similarity between two segments through how much they intersect in relation to a union of their individual areas; and
identify the two segments as matching based on the calculated IOU above a threshold.

18. The computer storage medium of claim 15, wherein the plurality of segmentation masks is extracted using a segmentation model, wherein the computer-executable instructions upon execution by the processor further cause the processor to:
update the segmentation model using the refined segmentation mask of the geographic area.

19. The computer storage medium of claim 15, wherein the representative segments are selected to maximize an area of the refined segmentation mask of the geographic area.

20. The computer storage medium of claim 15, wherein the representative segments are selected to maximize normalized difference vegetation index (NDVI) of the refined segmentation mask of the geographic area.

* * * * *